United States Patent
Park et al.

(10) Patent No.: US 11,335,932 B2
(45) Date of Patent: May 17, 2022

(54) PHOSPHONATED POLYMERS, AND METHODS OF PRODUCTION THEREOF, FOR USE AS POLYMER ELECTROLYTE MEMBRANES (PEMS) AND/OR CATALYST IONOMERIC BINDERS FOR ELECTRODES IN PEM FUEL CELLS

(71) Applicant: Triad National Security, LLC, Los Alamos, NM (US)

(72) Inventors: Eun Joo Park, Los Alamos, NM (US); Yu Seung Kim, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 58 days.

(21) Appl. No.: 16/869,885

(22) Filed: May 8, 2020

(65) Prior Publication Data

US 2020/0358120 A1 Nov. 12, 2020

Related U.S. Application Data

(60) Provisional application No. 62/844,905, filed on May 8, 2019.

(51) Int. Cl.
*H01M 8/1065* (2016.01)
*H01M 8/1023* (2016.01)
*C08G 61/02* (2006.01)

(52) U.S. Cl.
CPC .......... *H01M 8/1065* (2013.01); *C08G 61/02* (2013.01); *H01M 8/1023* (2013.01); *C08G 2261/147* (2013.01); *H01M 2250/20* (2013.01)

(58) Field of Classification Search
CPC .... H01M 8/1023; H01M 8/1065; C08G 61/02

USPC ......................................................... 429/482
See application file for complete search history.

(56) References Cited

U.S. PATENT DOCUMENTS

2009/0061277 A1* 3/2009 Sayre ..................... C08J 5/2256
429/402

FOREIGN PATENT DOCUMENTS

DE 102011015212 A1 9/2012

OTHER PUBLICATIONS

Miyatake, et al. "New Poly(arylene ether)s with Pendant Phosphonic Acid Groups"; Journal Polymer Science: Part A: Polymer Chemistry, 2001, 39, 3770-3779.
Liu, et al. "Fluorinated Poly(aryl ether) Containing a 4-Bromophenyl Pendant Group and its Phosphonated Derivative"; Macromol. Rapid Commun. 2006, 27, 1411-1417.

(Continued)

*Primary Examiner* — James M Erwin (57) ABSTRACT

The present disclosure provides phosphonated polymers that can be used, for example, as polymer electrolyte membranes (PEMs) and/or catalyst ionomeric binders for electrodes in PEM fuel cells, and more particularly for high-temperature PEM fuel cells. High-temperature PEM fuel cells that use phosphonated polymers of the present disclosure suffer from reduced or no acid leaching because, in at least some examples, phosphonic acid moieties are covalently bound to the backbone of the polymers. A phosphonated polymer include a backbone having one or more aromatic monomers, with each aromatic monomer having one or more phosphonic acid groups. A phosphonic acid group may include phosphonic acid or a functional group that is hydrolysable into phosphonic acid.

12 Claims, 4 Drawing Sheets

(56) References Cited

OTHER PUBLICATIONS

Rager, et al. "Poly(1,3-phenylene-5-phosphonic Acid), a Fully Aromatic Polyelectrolyte with High Ion Exchange Capacity"; Adv. Mater. 2007, 19, 3317-3321.
Atanasov, et al. "Highly Phosphonated Polypentafluorostyrene"; Macromolecules 2011, 44, 6416-6423.
Abouzari-Lotf, et al. "Phosphonated poly(arylene ether)s as potential high temperature proton conducting materials"; Polymer 2011, 52, 4709-4717.
Abouzari-Lotf, et al. "Phosphonated polyimides: Enhancement of proton conductivity at high temperatures and low humidity"; Journal of Membrane Science 2016, 516, 74-82.
Atanasov, et al. "Phosphonic acid functionalized poly (pentafluorostyrene) as polyelectrolyte membrane for fuel cell application"; Journal of Power Sources 2017, 343, 364-372.
Min, et al. "Preparation of Polymer Electrolyte Membranes Based on Poly(Phenylene oxide) with Different Side Chain Lengths of Phosphonic Acid"; Journal of Polymer Science 2019, 57, 1180-1188.
Gottesfeld "The Polymer Electrolyte Fuel Cell: Materials Issues in a Hydrogen Fueled Power Source"; http://sites.science.oregonstate. edu/~hetheriw/energy/topics/doc/electrochemistry/fc/basic/The_ Polymer_Electrolyte_Fuel_Cell.htm; retrieved Sep. 28, 2020.

\* cited by examiner

PHOSPHONATED POLYMERS, AND METHODS OF PRODUCTION THEREOF, FOR USE AS POLYMER ELECTROLYTE MEMBRANES (PEMS) AND/OR CATALYST IONOMERIC BINDERS FOR ELECTRODES IN PEM FUEL CELLS

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

BACKGROUND

Polymer electrolyte membrane (PEM) fuel cells are one of the most promising energy-efficient and environmentally friendly energy conversion devices. Currently available PEM fuel cell technologies include low-temperature PEM fuel cells, which utilize perfluorosulfonic acid membranes, and high-temperature PEM fuel cells, which utilize phosphoric acid-doped polybenzimidazole. Low-temperature PEM fuel cells are limited by a requirement of a high level of humidification for proton conduction. High-temperature PEM fuel cells suffer from low durability of the system due to acid leaching during operation.

SUMMARY

The present disclosure provides phosphonated polymers that can be used, for example, as polymer electrolyte membranes (PEMs) and/or catalyst ionomeric binders for electrodes in PEM fuel cells (and other fuel cells). The present disclosure also provides methods for producing the phosphonated polymers.

One benefit of the teachings herein is that high-temperature PEM fuel cells (e.g., having operating temperatures of about 30° C. to about 350° C., and more specifically about 80° C. to about 300° C.) that use phosphonated polymers of the present disclosure block and/or reduce acid leaching. In at least some embodiments, this is a result of phosphonic acid moieties being covalently bound to the backbone of the polymers, thereby blocking and/or reducing the leaching of proton-conducting acid groups at low temperature and high humidity conditions.

Moreover, phosphonated aromatic polymers, of the present disclosure, are promising candidates as proton conductors for high-temperature PEM fuel cells due to their ability to conduct protons in the absence of water. Phosphonated polymers of the present disclosure may, in at least some embodiments, have high degrees of phosphonic acid groups to ensure high proton conductivity.

In addition, the polymer backbone may include aromatic monomers that provide desirable properties such as, for example, high glass transition temperature, high impact strength and toughness, and good thermal, mechanical, and chemical stability.

An aspect of the present disclosure relates to a phosphonated polymer for use as a polymer electrolyte membrane (PEM) and/or a catalyst ionomeric binder for one or more electrodes in a PEM fuel cell. In at least some embodiments, the phosphonated polymer comprises a backbone comprising at least one aromatic monomer, and a functional group comprising a phosphonic acid or a phosphonate ester having a pKa value less than 1.83. In at least some embodiments, the at least one aromatic monomer is selected from the group consisting of:

In at least some embodiments, R' is individually selected to be hydrogen, fluorine, a methyl group ($CH_3$), or an alkyl group (($CH_2$)$_m$$CH_3$); m is an integer as low as 0 and as high as 10; and X is either oxygen or sulfur. In at least some embodiments, the functional group comprises an aromatic ring functionalized with at least one electron withdrawing group individually selected from the group consisting of a halogen, a nitrile (CN), a carbonyl group (RCOR), and a nitro group ($NO_2$). In at least some embodiments, the halogen is selected from the group consisting of fluorine and chlorine. In at least some embodiments, the functional group comprises an aromatic ring functionalized with at least one electron donating group. In at least some embodiments, the at least one electron donating group is individually selected from the group consisting of an alkyl group, an alcohol, and an amino group.

An aspect of the present disclosure relates to a polymer electrolyte membrane (PEM) fuel cell comprising an anode, a cathode, and a PEM positioned between the anode and the cathode, the PEM comprising a phosphonated polymer, the phosphonated polymer comprising a backbone comprising at least one aromatic monomer, and a functional group comprising a phosphonic acid or a phosphonate ester having a pKa value less than 1.83. In at least some embodiments, the at least one aromatic monomer is selected from the group consisting of:

In at least some embodiments, R' is individually selected to be hydrogen, fluorine, a methyl group ($CH_3$), or an alkyl group (($CH_2)_m CH_3$); m is an integer as low as 0 and as high as 10; and X is either oxygen or sulfur. In at least some embodiments, the functional group comprises an aromatic ring functionalized with at least one electron withdrawing group individually selected from the group consisting of a halogen, a nitrile (CN), a carbonyl group (RCOR), and a nitro group ($NO_2$). In at least some embodiments, the halogen is selected from the group consisting of fluorine and chlorine. In at least some embodiments, the functional group comprises an aromatic ring functionalized with at least one electron donating group. In at least some embodiments, the at least one electron donating group is individually selected from the group consisting of an alkyl group, an alcohol, and an amino group.

A further aspect of the present disclosure relates to a polymer electrolyte membrane (PEM) fuel cell comprising an anode, a cathode, a PEM positioned between the anode and the cathode, and catalyst ionomeric binder corresponding to at least one of the anode or the cathode, the catalyst ionomeric binder comprising a phosphonated polymer, the phosphonated polymer comprising a backbone comprising at least one aromatic monomer, and a functional group comprising a phosphonic acid or a phosphonate ester having a pKa value less than 1.83. In at least some embodiments, the at least one aromatic monomer is selected from the group consisting of:

In at least some embodiments, R' is individually selected to be hydrogen, fluorine, a methyl group ($CH_3$), or an alkyl group (($CH_2)_m CH_3$); m is an integer as low as 0 and as high as 10; and X is either oxygen or sulfur. In at least some embodiments, the functional group comprises an aromatic ring functionalized with at least one electron withdrawing group individually selected from the group consisting of a halogen, a nitrile (CN), a carbonyl group (RCOR), and a nitro group ($NO_2$). In at least some embodiments, the halogen is selected from the group consisting of fluorine and chlorine. In at least some embodiments, the functional group comprises an aromatic ring functionalized with at least one electron donating group individually selected from the group consisting of an alkyl group, an alcohol, and an amino group.

BRIEF DESCRIPTION OF DRAWINGS

For a more complete understanding of the present disclosure, reference is now made to the following description taken in conjunction with the accompanying drawings.

DETAILED DESCRIPTION

Figure 1:
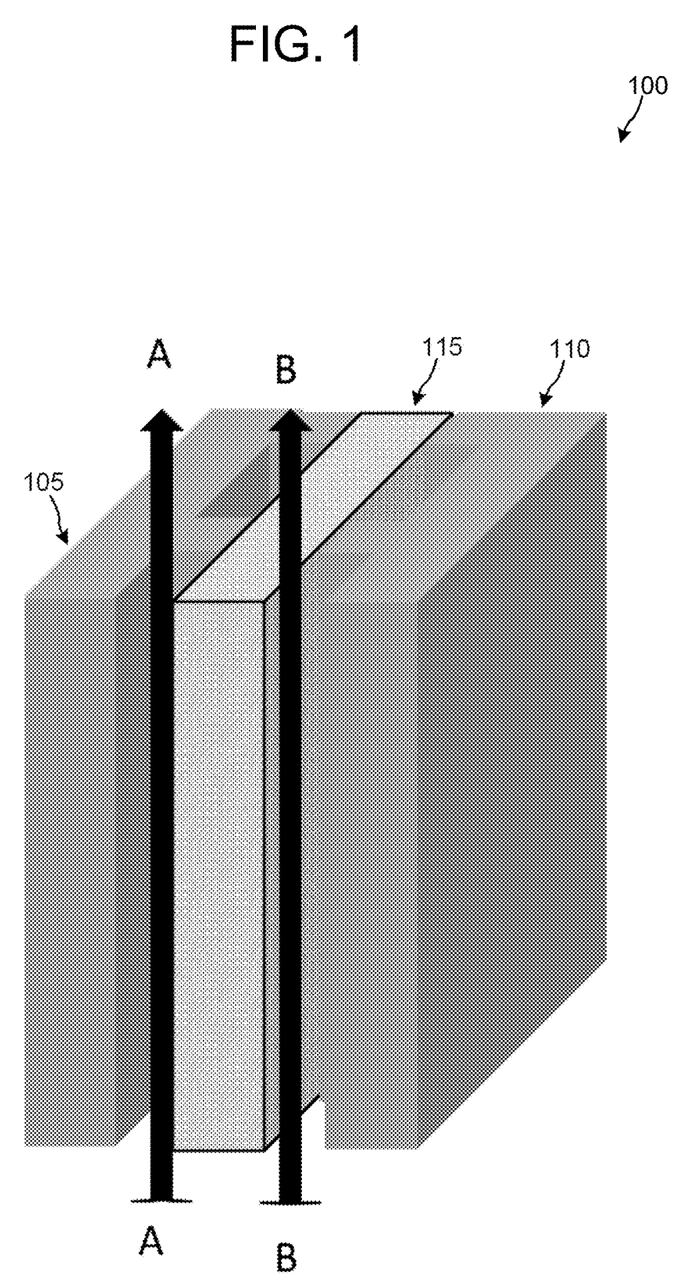
FIG. 1 is a conceptual diagram of a cross-section perspective view of a polymer electrolyte membrane (PEM) fuel cell, in accordance with to embodiments of the present disclosure.

A fuel cell is an electrochemical cell that converts potential energy from a fuel into electrical energy through an electrochemical reaction. A specific type of fuel cell is a polymer electrolyte membrane (PEM) fuel cell, which may be used by electric vehicles, for residential uses, as well as other uses. FIG. 1 is a conceptual cross-section perspective view of (PEM) fuel cell 100 according to embodiments of the present disclosure. It will be appreciated that the thicknesses, and other dimensions of components of the PEM fuel cell illustrated in FIG. 1, may not be to scale.

The PEM fuel cell may use hydrogen fuel and oxygen, from the air, to produce electricity. For example, hydrogen fuel (illustrated as line A-A) may be transported to, and fed along, an anode 105 on one side of the fuel cell 100. Meanwhile, oxygen from the air (illustrated as line B-B) may be transported to, and fed along, a cathode 110 positioned distant from the anode 105 within the fuel cell 100.

At the anode 105, a catalyst causes the hydrogen to split into positive hydrogen ions (i.e., protons) and negatively charged electrons. One skilled in the art will appreciate that the anode 105 may be comprised of one or more materials capable of causing a fuel to undergo oxidation reactions to generate protons and electrons. Non-limiting examples of types and compositions of an anode 105 include, but are not limited to, platinum (Pt) and Pt-alloy nanoparticles supported on carbons (high surface area carbon, Vulcan, etc.) bound by ionomer; Pt black bound by ionomer or other polymer; mixture of Pt supported carbon and iridium (Ir), iridium oxide (IrO$_2$), or other catalysts.

A PEM 115, located between the anode 105 and the cathode 110, allows the protons, but not the electrons, to pass through the PEM 115 to the cathode 110. Rather than passing through the PEM 105, the electrons travel along an external circuit (not illustrated) to the cathode 110, thereby creating an electrical current.

At the cathode 110, the electrons (after traveling along the external circuit) and the protons (after passing through the PEM 115) combine with the oxygen to form water. This water than flows out of the fuel cell 100. One skilled in the art will appreciate that the cathode 110 may be comprised of one or more materials capable of causing such reduction reactions. Non-limiting examples of types and compositions of a cathode 110 include, but are not limited to, Pt and Pt-alloy nanoparticles supported on carbons (high surface area carbon, Vulcan, etc.) bound by ionomer; Pt black bound by ionomer or other polymer; and ionomer free Pt deposited via physical vapor or chemical vapor deposition methods.

The present disclosure provides phosphonated polymers that can be used, for example, as PEMs and/or catalyst ionomeric binders for electrodes in PEM fuel cells (and other electrochemical devices). In at least some embodiments, phosphonated polymers of the present disclosure may be used as PEMs and/or catalyst ionomeric binders in high-temperature PEM fuel cells. In at least some embodiments, high-temperature PEM fuel cells, incorporating phosphonated polymers of the present disclosure, suffer from reduced or no acid leaching because phosphonic acid moieties are covalently bound to the backbone of the phosphonated polymers. While the present disclosure describes phosphonated polymers for use in PEM fuel cells, it is within the knowledge of one skilled in the art to take the teachings herein and adapt same to render phosphonated polymers described herein for use in other electrochemical devices.

Phosphonated Polymer Structure 1

The present disclosure envisions various structures of phosphonated polymers for use as PEMs and/or catalyst ionomeric binders for electrodes in PEM fuel cells (and other electrochemical devices). In at least some embodiments, a phosphonated polymer of the present disclosure may have a polymer backbone in which each monomer includes a single phosphonic acid group. An example chemical structure of such a phosphonated polymer monomer may be represented as:

where:
R is individually selected to be hydrogen, an electron withdrawing group (e.g., a halogen (e.g., fluorine, chlorine, etc.), nitrile group (CN), carbonyl group (RCOR), nitro group (NO$_2$), etc.), or an electron donating group (e.g., an alkyl group, alcohol, amino group, etc.);
Ar is an aromatic monomer; and
m is an integer as low as 10 and as high as 300.
With respect to the above chemical structure, "individually selected" means all of the R groups may be same, three of the R groups may be the same, two of the R groups may be the same, or all of the R groups may be different.

In at least some embodiments, it may be beneficial for R to be an electron withdrawing group. In at least some embodiments, such may provide electronic stabilization of phosphonic acid, increase an acidity of the phosphonic acid, and prevent phosphonic acid anhydride formation (via a condensation reaction). Prevention of phosphonic acid anhydride formation is beneficial because a functional group including a phosphonic acid anhydride has a reduced number of proton exchangeable groups, and thus a lower proton conductivity, than a functional group including phosphonic acid.

In at least some embodiments, the phosphonated polymer may be a homopolymer, meaning each backbone aromatic monomer (represented as Ar in the above chemical structure) is the same. In at least some other embodiments, the phosphonated polymer may be a copolymer, meaning the backbone comprises aromatic monomers of different chemical structures (see additional examples below). It is within the knowledge of one skilled in the art to produce a phosphonated polymer with appropriate homogeneity or heterogeneity given the desired properties of the phosphonated polymer. That is, the synthesis procedure for creating a homopolymer or a copolymer according to the present disclosure may be the same, but for a difference in number of monomers being used, which is within the knowledge of one skilled in the art.

Phosphonated Polymer Structure 2

An example chemical structure of a phosphonated polymer according to the present disclosure may be represented as:

where:

R is individually selected to be hydrogen, an electron withdrawing group (e.g., a halogen (e.g., fluorine, chlorine, etc.), nitrile group (CN), carbonyl group (RCOR), nitro group ($NO_2$), etc.), or an electron donating group (e.g., an alkyl group, alcohol, amino group, etc.);

Ar1 is an aromatic monomer;

Ar2 is an aromatic monomer; and

Ar3 is an aromatic monomer.

With respect to the above chemical structure, "individually selected" means all of the R groups (of a single monomer) may be same, three of the R groups (of a single monomer) may be the same, two of the R groups (of a single monomer) may be the same, or all of the R groups (of a single monomer) may be different.

In at least some embodiments, it may be beneficial for R to be an electron withdrawing group. In at least some embodiments, such may provide electronic stabilization of phosphonic acid, increase an acidity of the phosphonic acid, and prevent phosphonic acid anhydride formation (via a condensation reaction). Prevention of phosphonic acid anhydride formation is beneficial because a functional group including a phosphonic acid anhydride has a reduced number of proton exchangeable groups, and thus a lower proton conductivity, than a functional group including phosphonic acid.

With respect to the above chemical structure, one skilled in the art will appreciate that "m", "n", and "1-m-n" may be strategically selected based on desired polymer characteristics, reaction conditions and materials, and/or other considerations. By way of illustration, and not limitation, in at least some embodiments m may correspond to about 50% of the backbone monomers of the polymer, n may correspond to about 30% of the backbone monomers of the polymer, and 1-m-n may correspond to about 20% of the backbone monomers of the polymer.

In at least some embodiments, the phosphonated polymer may be a homopolymer, meaning each of Ar1, Ar2, and Ar3 are the same. In at least some other embodiments, the phosphonated polymer may be a copolymer. For example, Ar1 may be the same as Ar2, but different from Ar3; Ar2 may be the same as Ar3, but different from Ar1; or Ar1 may be the same as Ar3, but different from Ar2. For further example, a phosphonated polymer may be constructed to have multiple Ar1s of differing chemical structures, multiple Ar2s of differing chemical structures, and/or multiple Ar3s of differing chemical structures. It is within the knowledge of one skilled in the art to produce a phosphonated polymer with appropriate homogeneity or heterogeneity given the desired properties of the phosphonated polymer.

Phosphonated Polymer Backbone Monomers

In at least some embodiments, a polymer backbone may include only a single aromatic monomer species. In at least some other embodiments, a polymer backbone may include two aromatic monomer species. Yet further, in at least some embodiments, a polymer backbone may include three aromatic monomer species. A polymer backbone including more than three aromatic monomer species are also envisioned by the present disclosure.

In at least some embodiments, two adjacent aromatic groups, of a single backbone monomer, may be directly bonded. For example, a carbon of one benzene functionality may be directly bonded to a carbon of an adjacent benzene functionality of the same backbone monomer.

In at least some other embodiments, two adjacent aromatic groups, of a single backbone monomer, may be indirectly conjugated. For example, one benzene functionality may be conjugated to an adjacent benzene functionality, of the same backbone monomer, using one or more electron withdrawing functionalities. A non-limiting list of such electron withdrawing functionalities includes oxygen, sulfur, or a functionality including one or more halogens (e.g., fluorine, chlorine, etc.). For further example, in at least some embodiments, one benzene functionality may be conjugated to an adjacent benzene functionality, of the same backbone monomer, via one or more propyl groups. In at least some embodiments, when a single propyl group is used to conjugate adjacent benzene functionalities, each benzene functionality may bond directly to the central carbon atom of the propyl group.

Example aromatic monomers that may be included in a phosphonated polymer backbone of the present disclosure include, but are not limited to:

where:

R' is individually selected to be hydrogen, fluorine, a methyl group ($CH_3$), or an alkyl group ($(CH_2)_m CH_3$);

n is individually selected to be an integer as low as 1 and as high as 20; and

X is oxygen or sulfur.

The following is an example phosphonated polymer monomer of the present disclosure:

where:

R is individually selected to be hydrogen, an electron withdrawing group (e.g., a halogen (e.g., fluorine, chlorine, etc.), nitrile (CN), carbonyl group (RCOR), nitro group ($NO_2$), etc.), or an electron donating group (e.g., an alkyl group, alcohol, amino group, etc.);

m is an integer as low as 10 and as high as 300; and
x is an integer as low as 1 and as high as 6.

The following is an example phosphonated polymer monomer in which the backbone includes aromatic and non-aromatic functionalities:

where:

R is individually selected to be hydrogen, an electron withdrawing group (e.g., a halogen (e.g., fluorine, chlorine, etc.), nitrile (CN), carbonyl group (RCOR), nitro group ($NO_2$), etc.), or an electron donating group (e.g., an alkyl group, alcohol, amino group, etc.);

m is an integer as low as 10 and as high as 300; and x is an integer as low as 1 and as high as 6.

Each terminal aromatic ring of a backbone monomer may have bound thereto one or more phosphonic acid groups. Using the foregoing multiple aromatic ring monomer as an example, the monomer has 6 terminal aromatic rings—3 positioned in horizontal alignment along the top of the illustrated monomer and 3 positioned in horizontal alignment along the bottom of the illustrated monomer. One skilled in the art will appreciate that the number of phosphonic acid groups that may be bound to a monomer may depend on the makeup of the monomer. Moreover, one skilled in the art will appreciate that different phosphonic acid groups may bind to different locations of a same aromatic monomer of a polymer backbone depending on sterics, synthesis conditions, and other considerations.

Described above are various examples in which the phosphonated polymer backbone includes 6-carbon aromatic rings (i.e., benzene). It will be appreciated by one skilled in the art that the present disclosure is not limited thereto, and that a phosphonated polymer backbone may include aromatic rings having differing numbers of carbons without deviating from the present disclosure.

Aromatic monomers of a backbone may selected to provide properties such as, for example, high glass transition temperature, high impact strength and toughness, and good thermal, mechanical, and chemical stability.

Phosphonated Polymer Functional Groups

A phosphonated polymer monomer of the present disclosure may include one or more phosphonic acid groups. Example phosphonic acid groups include phosphonic acid ($H_2O_3P^+$), and other functional groups that may be hydrolyzed into phosphonic acid (e.g., phosphonate esters). Phosphonic acid groups may provide proton conductivity beneficial for use in a PEM (or other) fuel cell.

As illustrated herein above, a phosphonic acid group may include an aromatic ring substituted with multiple hydrogens, electron withdrawing groups (e.g., a halogen (e.g., fluorine, chlorine, etc.), nitrile (CN), carbonyl group (RCOR), nitro group ($NO_2$), etc.), and/or electron donating groups (e.g., an alkyl group, alcohol, amino group, etc.). In at least some embodiments, it may be beneficial for R to be an electron withdrawing group. In at least some embodiments, such may provide electronic stabilization of phosphonic acid, increase an acidity of the phosphonic acid, and prevent phosphonic acid anhydride formation (via a condensation reaction). Prevention of phosphonic acid anhydride formation is beneficial because a functional group including a phosphonic acid anhydride has a reduced number of proton exchangeable groups, and thus a lower proton conductivity, than a functional group including phosphonic acid. Phosphonic acid functional groups, according to the present disclosure, may be created using various techniques depending on starting material.

Synthesis of Phosphonated Polymers

Various synthesis schemes may be used to produce phosphonated polymers according to the present disclosure. One example synthesis scheme includes performing an acid-catalyzed Friedel-Crafts polycondensation and a Diels-Alder polymerization, followed by the $S_NAr$ Michaelis-Arbuzov reaction of aryl pentafluorides or metal (e.g., nickel or palladium)-catalyzed Arbuzov reaction of aryl halides. The ion exchange capacity (e.g., the degree of phosphonic acid) can be controlled and reached up to about 2.9 meq/g using the foregoing method.

Incorporation of Phosphonated Polymer as a PEM in a PEM Fuel Cell

In at least some embodiments, one or more phosphonated polymers of the present disclosure may be implemented as a PEM in a PEM fuel cell. Various techniques may be used to achieve such implementation.

As an illustrative, non-limiting example, a phosphonated polymer(s) may be cast as a thin film by the solution casting method. For example, a solution comprising one or more polymers (e.g., at least 5 wt %, at least 10 wt %, at least 15 wt %, etc.) may be prepared by dissolving the phosphonated polymer(s) in polar aprotic solvents (i.e., dimethyl sulfoxide, dimethylacetamide, etc.). The resulting solution may then be cast on a glass plate and dried at 80° C. under a positive airflow for about 24 hours, resulting in a thin film, which may then be used as a PEM in a membrane electrode assembly.

Incorporation of Phosphonated Polymer as a Catalyst Ionomeric Binder in a PEM Fuel Cell In at least some embodiments, one or more phosphonated polymers of the present disclosure may be implemented as a catalyst ionomeric binder in a PEM fuel cell. For example, one or more phosphonated polymers may be implemented as a catalyst ionomeric binder with respect to the anode of a PEM fuel cell, one or more phosphonated polymers may be implemented as a catalyst ionomeric binder with respect to the cathode of a PEM fuel cell, or one or more phosphonated polymers may be implemented as a catalyst ionomeric binder with respect to both the anode and the cathode of a single PEM fuel cell. When one or more phosphonated polymers are implemented as a catalyst ionomeric binder with respect to both the anode and the cathode of a single PEM fuel cell, the one or more phosphonated polymers implemented with respect to the anode may be the same as or different from the one or more phosphonated polymers implemented with respect to the cathode. In at least some embodiments, one or more phosphonated polymers of the present disclosure may be implemented as both a PEM and an ionomeric binder in a same fuel cell.

One or more phosphonated polymers may be prepared as a catalyst ionomeric binder using various techniques. As an illustrative, non-limiting example, one or more phosphonated polymers may be dissolved in a solvent mixture (i.e., low molecular weight alcohol, polar aprotic solvents, organic solvents, etc.) to produce a polymer solution. This polymer solution may then be mixed with metal catalysts to be deposited on the gas diffusion layer(s) for a membrane electrode assembly.

Examples

Synthesis of TP-PFPA (terphenylene pentafluorophosphonic acid) and BP-PFPA (biphenylene pentafluorophosphonic acid) Polymers A mixture of p-terphenyl (0.92 g, 4.0 mmol), octafluoroacetophenone (1.1 g, 4.1 mmol), dichloromethane (6.0 mL), and a magnetic stirring bar were placed in a 50 mL round-bottom flask and cooled in an ice bath. Trifluoromethanesulfonic acid (6.0 mL) was added in one portion, and the mixture was stirred for 30 minutes and slowly warmed to room temperature and stirred for an additional 72 hours. The resulting dark-brown, gel-like mass was poured into methanol, and the precipitate formed was filtered and washed with warm methanol. After drying under vacuum, 1.92 g of white fiber-like solid of TP-PF was obtained (99% yield).

Figure 2:
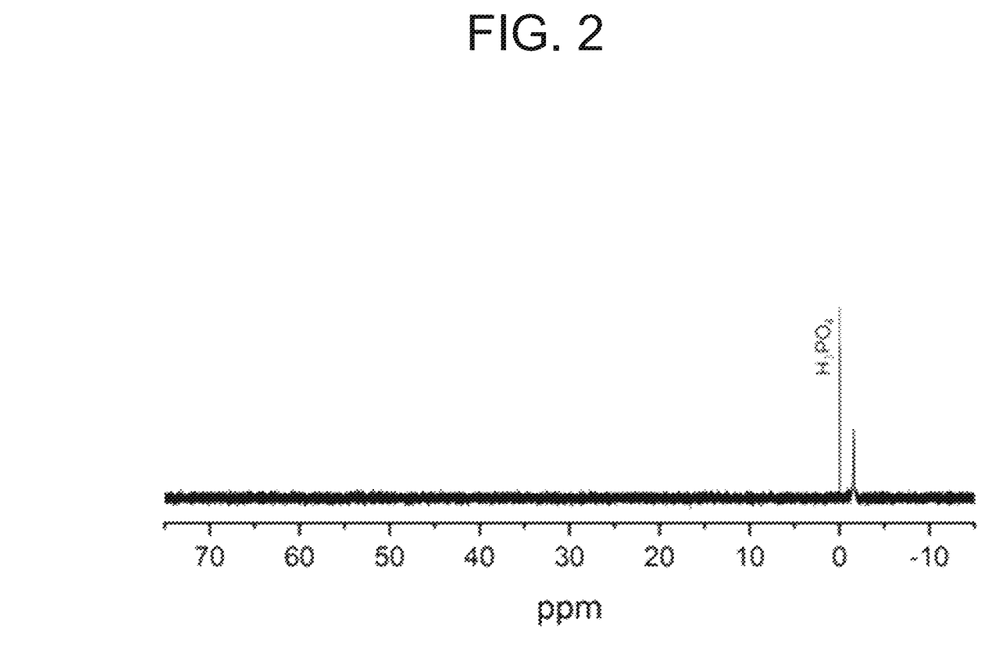
FIG. 2 is a $^{31}$P NMR spectrum of TP-PFPA in DMSO-$d_6$ ($H_3PO_4$ used as a reference standard at 0 ppm), according to embodiments of the present disclosure.

TP-PF (0.70 g, 1.5 mmol) was added to DMAc (2.8 mL, 25 wt %), and the mixture was heated to 180° C. to dissolve the polymer. Tris(trimethylsilyl)phosphine (1.03 mL, 2.94 mmol) was added dropwise to the mixture and stirred at 180° C. for 14 hours. The mixture was cooled to room temperature and diluted with DMSO (3.0 mL) and poured into water to precipitate the white solid. The white solid was then refluxed in water for 30 min, followed by boiling it in a 2% phosphoric acid solution and thoroughly washing with water. After drying under vacuum, 0.71 g of light orange solid of TP-PFPA was obtained (88% yield). Synthesis of TP-PFPA was confirmed using NMR spectroscopy (see FIG. 2). As shown in FIG. 2, the peak of $PO_3H_2$ was found at −1.60 ppm due to the electron withdrawing effect of the adjacent fluorines. The NMR spectrum of FIG. 2 shows that there is no other phosphorous moiety left in the polymer structure.

The following is an illustration of the foregoing synthesis to produce TP-PFPA:

The following is an illustration of how the foregoing synthesis may be used to produce BP-PFPA polymers:

It will be appreciated that the foregoing synthesis schemes are merely illustrative of how to synthesize example phosphonated polymers (i.e., TP-PFPA and BP-PFPA) according to the present disclosure. One skilled in the art will understand how to alter the foregoing synthesis schemes to generate other phosphonated polymers within the scope of the present disclosure.

Phosphonated Polymer pKa

As known in the art, the pKa value may be used to indicate the strength of an acid. pKa is the negative log of the acid dissociation constant, or Ka value. A lower pKa value indicates a stronger acid. For example, phenylphosphonic acid is known to have a pKa value of 1.83.

As an example, phosphonated polymers of the present disclosure including fluorphosphonic acid functional groups have exhibited pKa values of about 1.3. Thus, phosphonic acid, of phosphonated polymers of the present disclosure, may be more acidic than phenylphosphonic acid. Accordingly, it will be appreciated that phosphonated polymers of the present disclosure may exhibit higher proton conductivity than polymers including phenylphosphonic acid.

Fuel Cell Performance

Figure 3A:
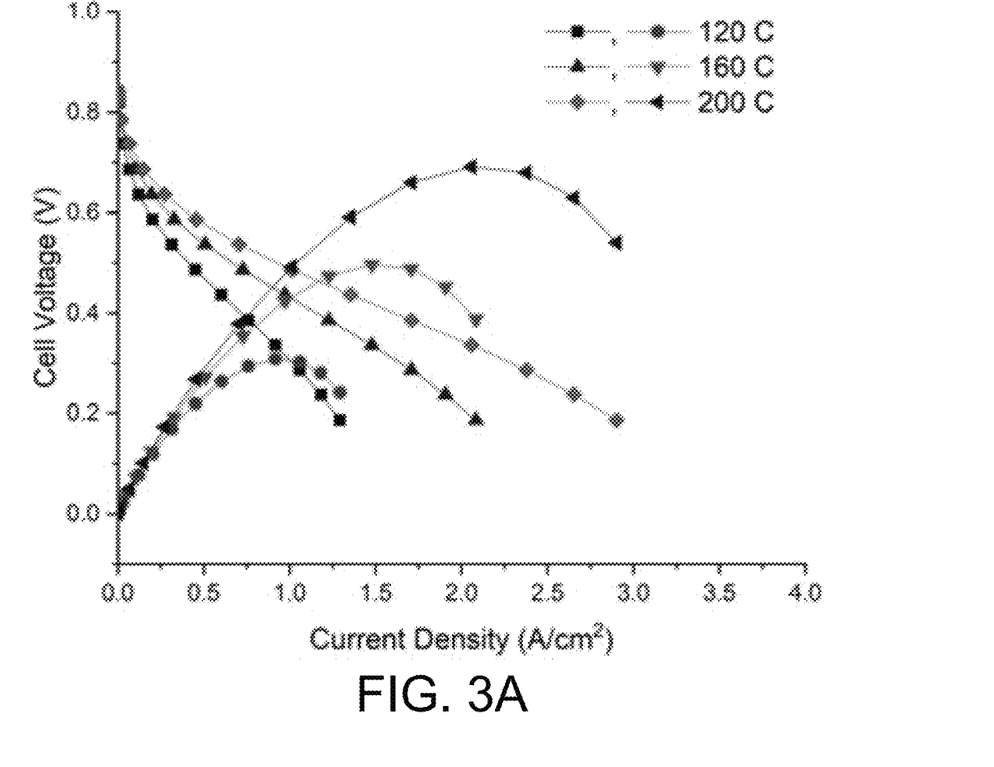
FIG. 3A illustrates polarization curves for membrane electrode assemblies (MEAs) operated at 120° C., 160° C., and 200° C., according to embodiments of the present disclosure.
Figure 3B:
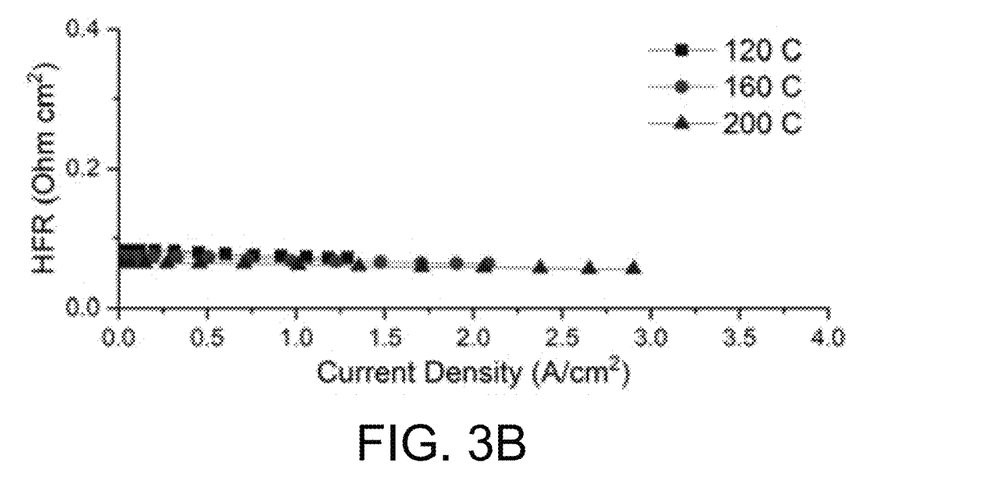
FIG. 3B illustrates high frequency resistance of MEAs operated at 120° C., 160° C., and 200° C., according to embodiments of the present disclosure.

Fuel cell performance of biphenylene pentafluorophosphonic acid (BP-PFPA) ionomer was measured at different temperatures: 120° C., 160° C., and 200° C. $H_2/O_2$ fuel cell performance of the membrane electrode assemblies (MEAs) was measured using a fuel cell test station (Fuel Cell Technologies, Inc., Albuquerque, N. Mex., USA). The MEA, which used BP-PFPA ionomers, was first heated to 120° C. under anhydrous $N_2$ flow, at which point gases were switched to $H_2$ and $O_2$, and cell temperature was further increased to 160° C. Current increase was monitored at constant voltage of 0.6 V until stabilization. After stabilization at 160° C. for 4 hours, the cell voltage was lowered to 0.5 V, which resulted in the current density increasing further. An additional stabilization time of greater than 10 hours was required for full break-in. Polarization curves (see FIG. 3A) and high frequency resistance (HFR) (see FIG. 3B) of the MEAs were obtained at cell temperatures of 160° C. and 200° C. $H_2$ and $O_2$ were supplied at 500 sccm without humidification and 141.7 $kPa_{abs}$ backpressure was applied to both the anode and cathode. Anode/cathode Pt loadings were 0.75/0.6 $mg_{pt}/cm^2$ using commercial 75 wt % PtRu/60 wt % Pt/C catalysts, respectively.

By using a BP-PFPA ionomer as an electrode ionomer of high temperature PEM fuel cells, a peak power density up to 700 mW $cm^{-2}$ was achievable at a density of 2.1 A $cm^2$ at 200° C. Despite the research of their synthesis for more than decades, only few successful examples of phosphonated polymers in the PEMFCs have been reported.

High-Temperature Proton Conductivity

Figure 4:
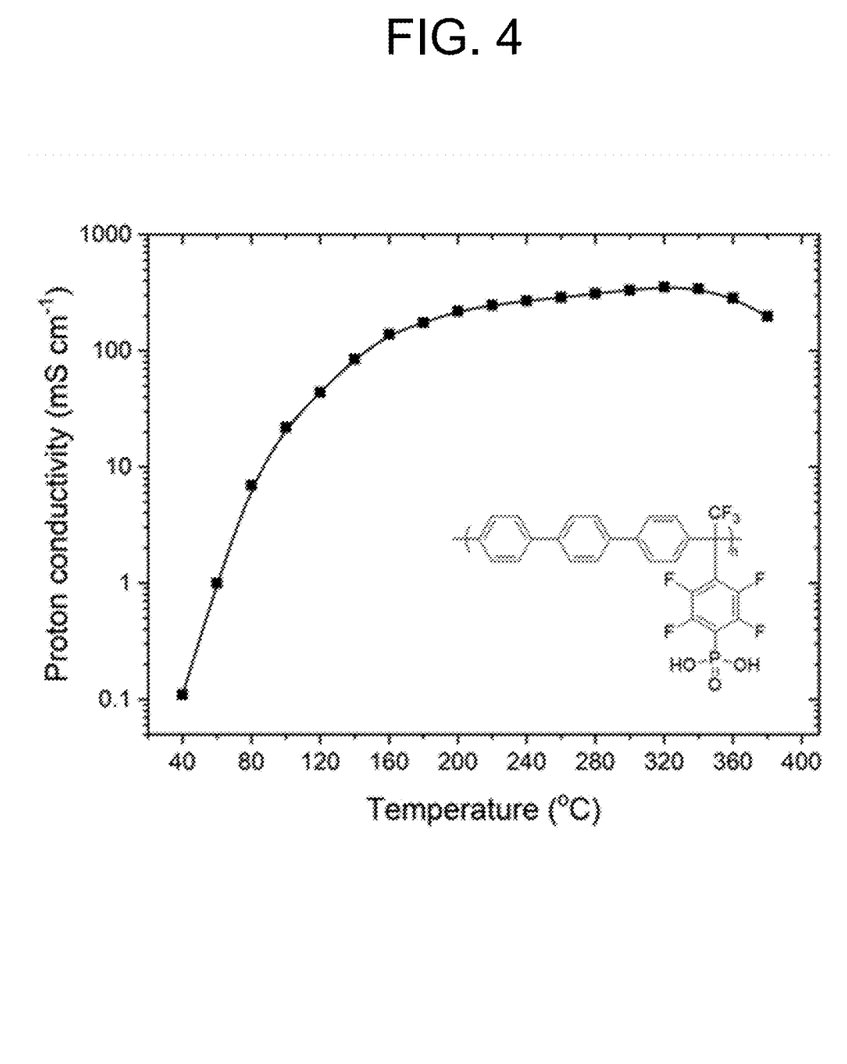
FIG. 4 illustrates high temperature proton conductivity of a phosphonated membrane, poly(terphenylene pentafluorophosphonic acid) (TP-PFPA) (IEC 1.9 meq./g), according to embodiments of the present disclosure.

FIG. 4 illustrates high temperature proton conductivity of a phosphonated membrane, poly(terphenylene pentafluorophosphonic acid) (TP-PFPA) (IEC 1.9 meq./g).

The proton conductivity was measured using a large window cell (width of the window: 2 cm, samples dimension 1 cm×4 cm×30 μm) in the temperature range of 40° C. to 380° C. under anhydrous condition. A custom-built polytetrafluoroethylene (PTFE) block was used to clamp the samples in place with stainless steel electrodes (2 cm apart). For temperatures less than 100° C., a humidity-controlled oven was used to control temperature and humidity, and at least 12 hour equilibrium time was given prior to measurement. For anhydrous measurements between the temperatures of 100° C. to 280° C., a convection oven was used as the chamber. For temperatures 300° C. and above, the insulating PTFE blocks were substituted with commercial glass fiber filter paper (Whatman GF/A) without binder, which has a thickness of 0.26 mm and upper operating temperature of 550° C., and the connecting metal cables were stripped of insulating materials and inserted in a Thermo Scientific tube furnace (Lindberg/Blue M) as a temperature control chamber.

The proton conduction of the TP-PFPA was low at temperatures below 100° C. However, it gradually increased with increase in temperature due to the facilitated proton transfer by hydrogen bonding through the Grotthus mechanism. The membrane showed a maximum proton conductivity of 354 mS cm$^{-1}$ at 320° C. The data confirms that the herein disclosed phosphonated polymers are highly conductive under anhydrous condition above 300° C., which is beneficial for the materials used in high temperature electrochemical devices.

While the present disclosure has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. A phosphonated polymer for use as a polymer electrolyte membrane (PEM) and/or a catalyst ionomeric binder for one or more electrodes in a PEM fuel cell, comprising:
   a backbone comprising at least one aromatic monomer; and
   a functional group comprising a tetrafluorophenylphosphonic acid or a tetrafluorophenylphosphonate ester.

2. The phosphonated polymer of claim 1, wherein the at least one aromatic monomer is selected from the group consisting of:

3. The phosphonated polymer of claim 2, wherein:
   R' is individually selected to be hydrogen, fluorine, a methyl group (CH3), or an alkyl group ((CH2)mCH3), wherein m is an integer as low as 0 and as high as 10; and
   X is either oxygen or sulfur.

4. A polymer electrolyte membrane (PEM) fuel cell comprising:
   an anode;
   a cathode; and
   a PEM positioned between the anode and the cathode, the PEM comprising a phosphonated polymer, the phosphonated polymer comprising:
   a backbone comprising at least one aromatic monomer; and
   a functional group comprising a tetrafluorophenylphosphonic acid or a tetrafluorophenylphosphonate ester.

5. The PEM fuel cell of claim 4, wherein the at least one aromatic monomer is selected from the group consisting of:

-continued

6. The PEM fuel cell of claim 5, wherein:

R' is individually selected to be hydrogen, fluorine, a methyl group (CH3), or an alkyl group ((CH2)mCH3), wherein m is an integer as low as 0 and as high as 10; and X is either oxygen or sulfur.

7. A polymer electrolyte membrane (PEM) fuel cell comprising:

an anode;
a cathode;
a PEM positioned between the anode and the cathode; and
catalyst ionomeric binder corresponding to at least one of the anode or the cathode, the catalyst ionomeric binder comprising a phosphonated polymer, the phosphonated polymer comprising:
a backbone comprising at least one aromatic monomer; and
a functional group comprising a tetrafluorophenylphosphonic acid or a tetrafluorophenylphosphonate ester.

8. The PEM fuel cell of claim 7, wherein the at least one aromatic monomer is selected from the group consisting of:

9. The PEM fuel cell of claim 8, wherein:

R' is individually selected to be hydrogen, fluorine, a methyl group (CH3), or an alkyl group ((CH2)mCH3), wherein m is an integer as low as 0 and as high as 10; and X is either oxygen or sulfur.

10. The phosphonated polymer of claim 1, wherein the backbone consists essentially of two or more adjacent aromatic groups, wherein the adjacent aromatic groups are directly bonded together by carbon-carbon bonds.

11. The PEM fuel cell of claim 4, wherein the backbone consists essentially of two or more adjacent aromatic groups, wherein the two or more adjacent aromatic groups are directly bonded together by carbon-carbon bonds.

12. The PEM fuel cell of claim 7, wherein the backbone consists essentially of two or more adjacent aromatic groups, wherein the two or more adjacent aromatic groups are directly bonded together by carbon-carbon bonds.

* * * * *